No. 823,324.

PATENTED JUNE 12, 1906.

A. G. DUNLOP.
HARROW TOOTH HOLDER.
APPLICATION FILED FEB. 1, 1906.

WITNESSES

INVENTOR
ANDREW G. DUNLOP.
BY Paul & Paul
HIS ATTORNEYS.

UNITED STATES PATENT OFFICE.

ANDREW G. DUNLOP, OF MINNEAPOLIS, MINNESOTA.

HARROW-TOOTH HOLDER.

No. 823,324.  Specification of Letters Patent.  Patented June 12, 1906.

Application filed February 1, 1906. Serial No. 298,965.

*To all whom it may concern:*

Be it known that I, ANDREW G. DUNLOP, of Minneapolis, Hennepin county, Minnesota, have invented certain new and useful Improvements in Harrow-Teeth Holders, of which the following is a specification.

My invention relates to harrows of the type wherein several sections are arranged side by side and connected with a head-beam or draft-bar.

The object of my invention is to provide a tooth-holder particularly adapted for a frame of light construction, the holder supporting the tooth and bracing it securely without adding materially to the weight of the bar on which it is mounted.

A further object is to provide a tooth-holder which is readily accessible and easily put in place on the harrow or removed.

The invention consists generally in various constructions and combinations, all as hereinafter described, and particularly pointed out in the claims.

Figure 4:
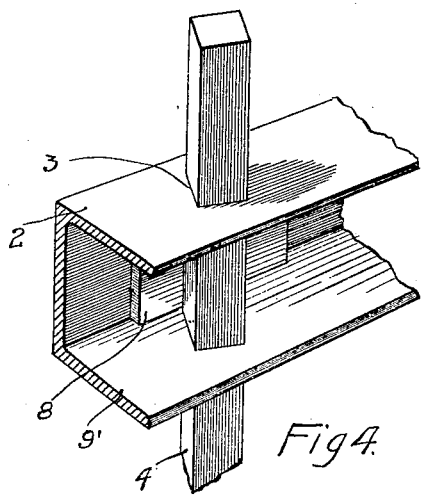
Figure 5:
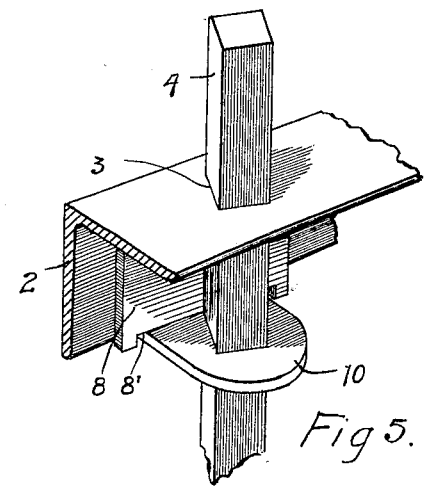
Figure 6:
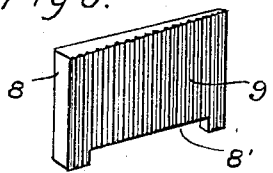
Figure 1:
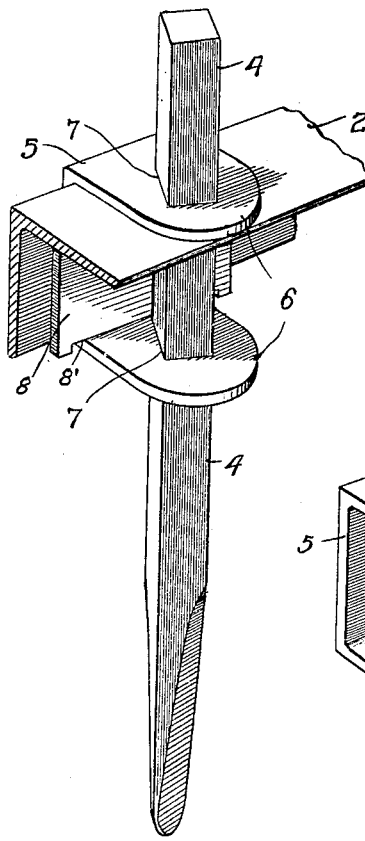
Figure 2:
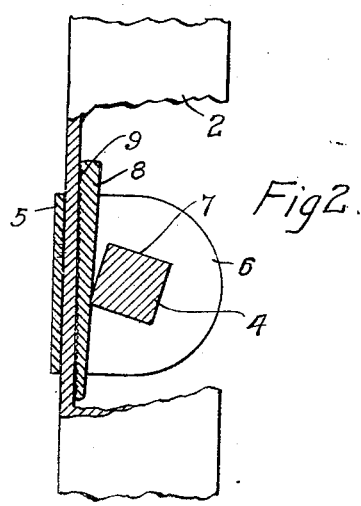
Figure 3:
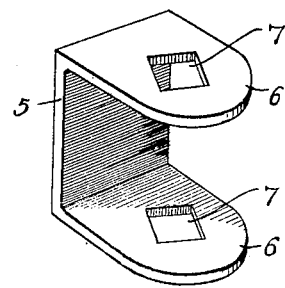

In the accompanying drawings, forming part of this specification, Figure 1 is a perspective view of a portion of a harrow-frame bar, showing the tooth-holder and tooth thereon. Fig. 2 is a sectional view showing the means for locking the tooth in the bar. Fig. 3 is a perspective view illustrating the clip device or holder in which the tooth is mounted. Fig. 4 is a detail sectional view in perspective illustrating a modification in the form of bar employed. Fig. 5 is a similar view illustrating still another modification. Fig. 6 is a perspective view of the locking-wedge used for securing the tooth in the holder.

I have not thought it necessary in this application to show a complete harrow-frame, it being sufficient to state that it is composed of a series of bars suitably connected and wherein the teeth are mounted. It is desirable in an agricultural implement of this kind to economize as much as practicable in weight without sacrificing strength and durability. I therefore provide a frame having bars composed of angle-iron 2 of suitable dimensions, having holes 3 at intervals in its horizontal flange, in which the square shank of the tooth 4 is inserted. A clip 5 is adapted to inclose the bar 4 and is provided with horizontal ends or ears 6, having holes 7 adapted to coincide with the hole in the horizontal flange of the bar and receive the shank of the tooth. A space is provided between the tooth-shank and the vertical flange of the bar, and into this space a wedge 8 is driven, having a broad bearing-surface in the vertical flange and provided, preferably, with corrugations 9, which grip the said surface and prevent the wedge from working loose. The teeth are set at such an angle in the bars, as indicated in Fig. 2, that the strain on them in moving through the soil will have the effect of drawing the wedges more snugly between the teeth and the vertical flanges of the bars. When the wedges are driven firmly into place, the clips will be drawn up against the vertical flanges, and the teeth will be securely held against accidental movement. I prefer to provide one edge of the wedge 8 with a recess 8' of substantially the same length as the width of the clip 5, so that when the wedge is inserted between the tooth and the vertical flange of the bar the clip will slip into the recess and the wedge be locked securely and be prevented from slipping out of place and releasing the tooth.

In Fig. 4 I have shown a modification in the construction of the harrow-frame, which consists in providing a channel-bar 9', having a vertical flange and two horizontal flanges, one over the other. The teeth are mounted at intervals in these flanges in the manner already described and are locked therein by means of the wedge.

In Fig. 5 another modification is shown, which consists in providing ears 10 on the lower edge of the vertical flange, said ears being riveted or brazed to said flange or formed by cutting away portions of the lower horizontal flange of the channel-bar. In either case the bar will be lightened materially, thereby removing the chief objection to the use of the channel-bar, and the detachable clip shown in Fig. 1 will be omitted, the tooth being firmly held between the upper horizontal flange and the ear by means of the wedge inserted between the tooth and the vertical flange. These holders may be made in any suitable size and weight, according to the size of the teeth and the bars whereon the holders are used. Whenever desired, the wedges may be loosened and the teeth easily and quickly removed.

I claim as my invention—

1. The combination with a harrow-bar having an upright flange and provided with members projecting substantially parallel with one another in a direction at right angles thereto, and having vertical sockets, of a tooth fitting within said sockets, and a wedge inserted between said tooth and said upright flange and adjustable at right angles to said tooth to hold said tooth at various adjustments, substantially as described.

2. The combination with a harrow-bar having an upright flange, a flange at the top of said upright flange, and an ear at the lower edge of said upright flange, said last-named flange and ear being substantially parallel and extending in a direction at right angles to the upright flange and having sockets, of a harrow-tooth fitting within said sockets, and a wedge inserted between said tooth and upright flange and adjustable at right angles to the tooth for locking the tooth in its sockets, substantially as described.

3. The combination with a harrow-bar composed of angle-iron, a clip inclosing said bar and having ears extending horizontally, one of said ears resting on the horizontal flange of said bar and the other extending substantially parallel with said horizontal flange from the lower edge of the vertical flange, said ears and horizontal flange having sockets coinciding with one another, a tooth fitting within said sockets, and a wedge inserted between said tooth and said vertical flange and adjustable at right angles to the tooth for locking said tooth therein.

4. The combination with an angle-bar, of a clip inclosing the same and having right-angled extensions provided with sockets coinciding with a socket in the horizontal flange of said bar, a tooth fitting within said sockets, and a wedge interposed between said tooth and the vertical flange of said bar and adjustable at right angles to the tooth to lock the tooth in various adjustments thereof, substantially as described.

5. In a harrow-frame, a bar having an upright flange and provided with members projecting in a direction at right angles thereto in substantially parallel planes, said members having sockets, in combination with a tooth fitting within said sockets, and a wedge inserted between said tooth and said upright flange, and adjustable at right angles to the tooth for locking said tooth in its socket.

In witness whereof I have hereunto set my hand this 22d day of January, 1906.

ANDREW G. DUNLOP.

Witnesses:
RICHARD PAUL,
C. MACNAMARA.